United States Patent
Gorzell

[15] 3,684,180
[45] Aug. 15, 1972

[54] SPRINKLER SYSTEM WHEEL STRUCTURE

[72] Inventor: Keith E. Gorzell, P.O. Box 502, Lake City, Calif. 96115

[22] Filed: May 17, 1971

[21] Appl. No.: 143,884

[52] U.S. Cl.................239/212, 239/286, 301/5 R
[51] Int. Cl. .............................................A01g 25/02
[58] Field of Search.............239/212, 177, 213, 286; 301/5 R, 46, 47; 303/4

[56] References Cited

UNITED STATES PATENTS 1,015,545   1/1912   Craig............................301/47
3,230,969   1/1966   239..............................212 X/

FOREIGN PATENTS OR APPLICATIONS 246,424   8/1963   Australia..................239/212

Primary Examiner—M. Henson Wood, Jr.
Assistant Examiner—John J. Love
Attorney—Gregg, Hendricson & Caplan

[57] ABSTRACT

Hydraulically actuated legs pivot curved feet radially outward of a sprinkler wheel for fixing the wheel position as upon uneven terrain. Water dispensed by a wheeled sprinkler system operates the hydraulic actuating cylinder hereof and springs retract the feet upon termination of water pressure to the system.

10 Claims, 8 Drawing Figures

PATENTED AUG 15 1972 3,684,180
SHEET 1 OF 2

INVENTOR.
KEITH E. GORZELL
BY
Gregg, Henderson & Caplan
ATTORNEYS

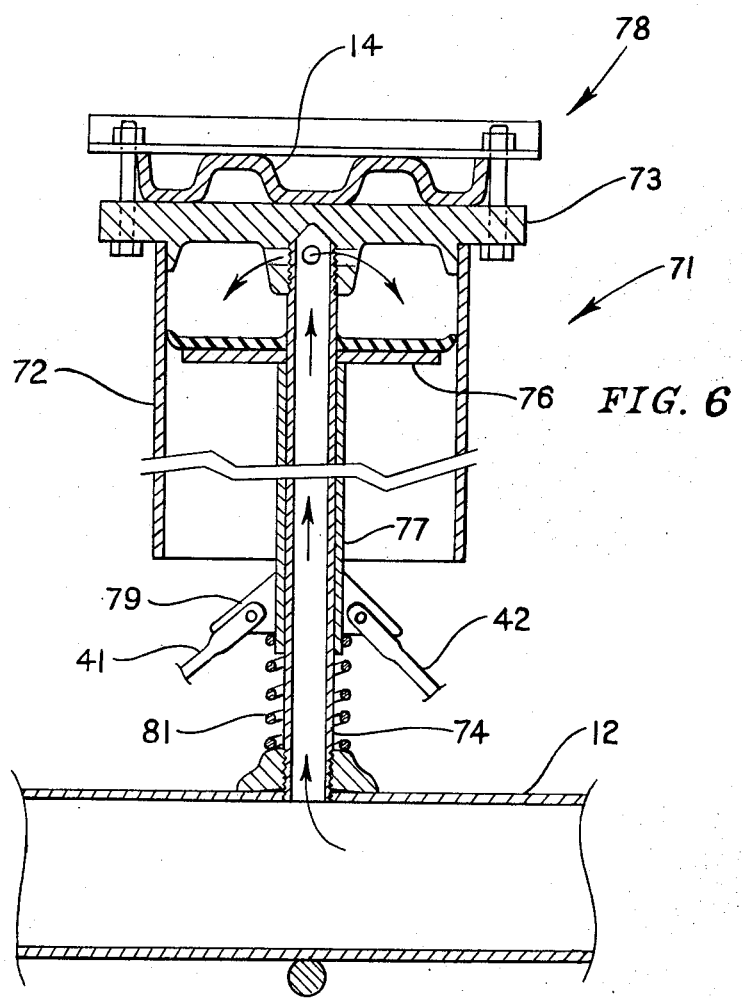
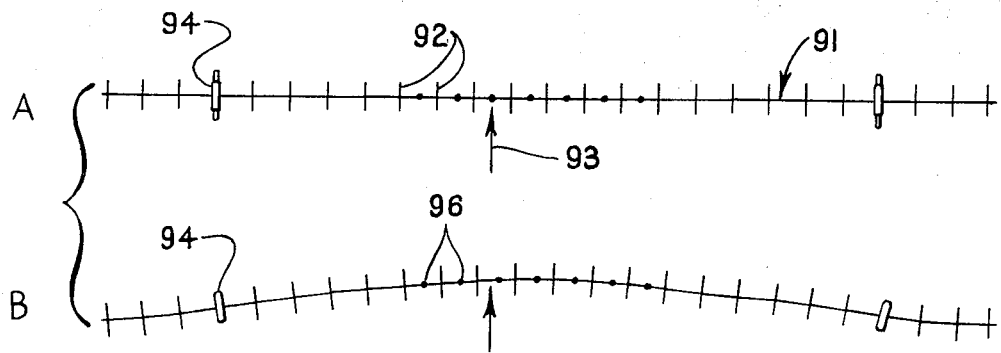
FIG. 7
INVENTOR.
KEITH E. GORZELL

SPRINKLER SYSTEM WHEEL STRUCTURE

BACKGROUND OF INVENTION

Many types of agricultural crops require irrigation and overhead irrigation is normally provided by some type of large sprinkling system. In this respect there has been developed what is termed a wheel roll sprinkler system wherein a pipe or sections of pipe coupled together form the axles of a number of large spaced wheels. By the provision of a central drive mechanism that turns the pipe or line, the wheels may be rolled from one sprinkling location to another in a field, for example. This type of sprinkler system materially reduces the amount of manual labor involved in moving a sprinkler line.

One of the problems involved in the use of a wheel roll sprinkler systems is the necessity of ensuring that the sprinkler heads are perpendicular to the ground to obtain maximum irrigation water coverage. Various circumstances affect the wheel position when the line is moved such as irregularities in the ground surface, mud, wind and possible entanglement of the system with crops or the like.

In order to overcome the above-noted problems or difficulties with wheel alignment or positioning, there have been devised various methods intended to hold the line in position. In this respect so-called drag stakes may be connected to the line to drag along the ground as the line is moved forward but which are driven into the ground by any attempted reverse movement of the line. This approach is primarily useful in areas wherein strong prevailing winds occur that might otherwise roll the line. There have also been devised various types of legs that may be folded out of the wheel to hold the wheel in position. However, these are operated by hand and consequently require manual labor to fold or unfold the legs and, furthermore, fail to provide initial alignment or positioning of the wheel. More prosaic approaches are found in the provision of wood blocks that may be tied to the wheel to keep it from rolling or even the mounding of dirt around the wheel to maintain it in adjusted or relocated position. Each of the methods noted above require an operator to physically walk to the wheel to be aligned.

There has additionally been devised and, in fact, marketed a swinging gooseneck system allowing the sprinkler head to swing on the line and thus remain in upright position. Difficulties with this system include the expense thereof and a certain lack of dependability unless the system is carefully maintained.

The present invention provides an improved self-aligning wheel for an agricultural sprinkling system which automatically aligns the wheel after each movement of the system to thus align the portion of the system on the side of central drive mechanism carried by such wheel.

SUMMARY OF INVENTION

The present invention is attached to and forms a part of a large wheel employed for mounting and moving irrigation pipe in agricultural sprinkling systems. Wheels of this general type are known in the art and, in fact, are widely employed to move sprinkling systems from one location to another in large fields. Sprinkling heads mounted on a pipeline which extends as axles through a wheel on each side of central drive means are supplied with water to spray the water over the ground and crops that may be growing thereon.

The present invention provides a pair of curved feet disposed on the exterior periphery of a sprinkler wheel and conforming to the curvature of the wheel. Actuating means such as a hydraulic ram or cylinder is mounted within the wheel with legs extending from the piston rod of the cylinder into pivotal engagement with the two above-noted feet. These feet are themselves pivotally mounted on the periphery of the wheel in back-to-back relationship with the mountings being separated about 45° of arc on the wheel. Additionally the feet have a substantial length as of the order of 45° of arc on the periphery of the wheel so that, upon being moved or pivoted outwardly of the wheel, they provide a substantial contact area with the earth for initially righting the wheel into an upright position and maintaining the wheel in such alignment. The length and spacing of the feet may be varied to suit conditions.

The invention furthermore provides for automatic return of the feet thereof, as by the mounting of one or more springs within the wheel and engaging the legs.

Application of water pressure to the system through the central pipe or line applies hydraulic pressure to the ram or cylinder hereof through a connection to the pipe so that the feet are forced outwardly to align the wheel in upright position and the feet are maintained in extended position as long as water pressure is maintained in the system. Upon termination of water pressure by cutting off the flow of water to the irrigation system, the return springs then draw the legs upwardly to fold the feet back against the periphery of the wheel and automatically retain the feet in such position for movement of the system.

DESCRIPTION OF FIGURES

The present invention is illustrated as to particular preferred embodiments thereof in the accompanying drawings wherein:

FIG. 6 is a central sectional view through an alternative ram actuating arrangement; and FIG. 7 is a schematic illustration of a wheel roll irrigation system in aligned and misaligned condition.

DESCRIPTION OF PREFERRED EMBODIMENTS

Figure 1:
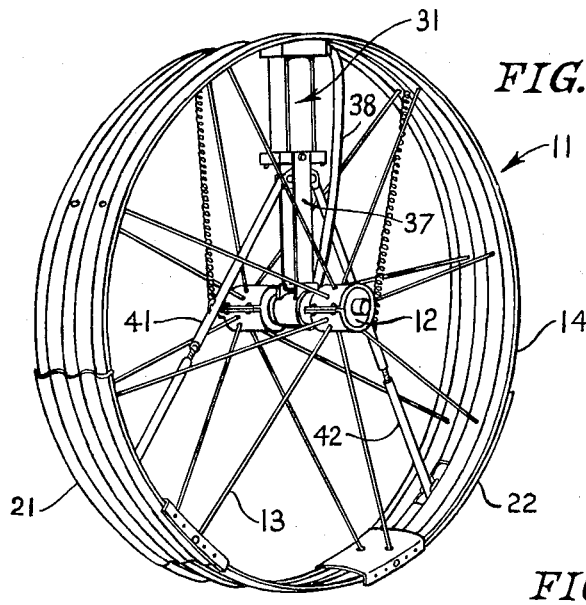
FIG. 1 is a perspective view of one wheel of a wheel roll sprinkler system and incorporating the present invention.
Figure 3:
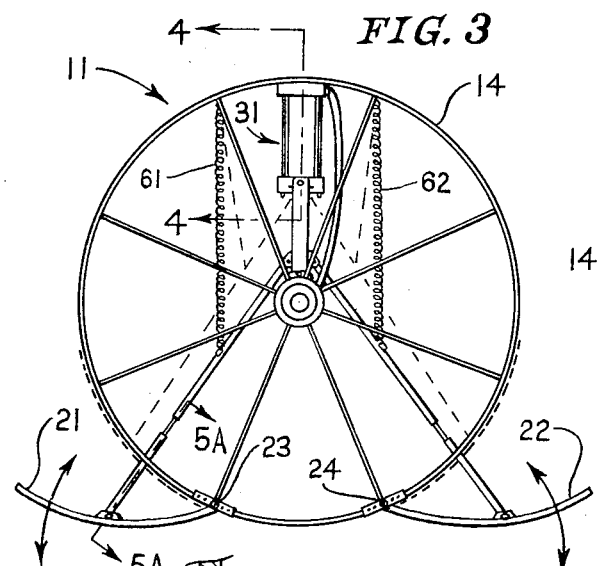
FIG. 3 is a side elevational view of the wheel of the present invention with the support feet extended.
Figure 2:
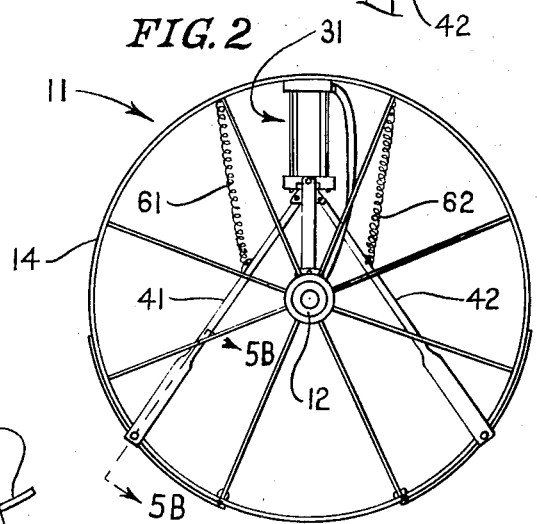
FIG. 2 is a side elevational view of the wheel of the present invention with the feet retracted for movement of the system.

Referring now to the drawings, there will be seen to be illustrated in FIG. 1 a wheel 11 for a wheel roll sprinkler system with a pipeline 12 of the system forming the axle of the wheel. Spokes 13 connect the axle and wheel rim 14. In practice the wheel may have a substantial size such as, for example, 4 to 5 feet in diameter, and also has a substantial width of rim to readily accommodate rolling of the wheel over uneven terrain. The wheel rim 14 may be corrugated as indicated in FIG. 1 and to this extent the wheel illustrated is quite conventional. In accordance with the present invention the wheel 11 is modified to provide a pair of support feet 21 and 22 pivotally mounted by means of hinges 23 and 24 respectively on the periphery of the wheel rim, as indicated in FIG. 3, for example. The support feet 21 and 22 have the same or substantially the same curvature as the wheel rim and are adapted to fit on the exterior of the rim, as indicated in FIG. 2, so as to provide no impediment to the rolling of the wheel during movement of the sprinkler system. Further with regard to the aligning and positioning feet of the wheel, it is noted that the hinges 23 and 24 are spaced apart a distance of about 45° of arc on the periphery of the wheel. The feet 21 and 22 have a substantial length so as to provide maximized stability to the sprinkler wheel when the feet are pivoted outwardly, as discussed below. Each of the feet may, for example, subtend an angle of approximately 45° on the periphery of the wheel.

Figure 4:
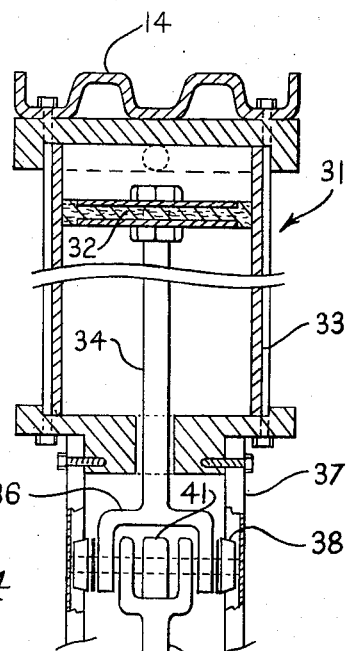
FIG. 4 is a central sectional view taken in the plane 4—4 of FIG. 3 illustrating the interior of the hydraulic ram of the present invention.

The aligning feet 21 and 22 are adapted to be automatically pivoted outwardly and retracted by actuation means. Such means may be comprised as an electric motor, for example, controlled by water pressure in the system. Preferably, and probably most simply, such actuating means may be provided as a hydraulic cylinder or ram 31 shown to be mounted in the wheel between the rim 14 and pipe forming the axle 12. The ram 31, as it is hereinafter termed, may take a variety of different configurations and one possible configuration is illustrated in FIG. 4 wherein a piston 32 is shown to be mounted within a cylinder 33 with this cylinder including end caps bolted to the wheel rim 14. A piston rod 34 extends from the piston 32 through the bottom end cap of the cylinder into engagement with a mounting unit 36 described in more detail below. Channel bars or straps 37 connect the ram to the central pipe 12 forming the axle of the wheel. A connection 38 is provided from this axle pipe 12 to the top of the ram cylinder 33 and this connection may, for example, take the form of a hose. In practice there may be provided a collar about the pipe for attachment of the straps and the hose. Application of water pressure to the line 12 will thus be seen to also apply this pressure through the connector 38 to the top of the ram cylinder so as to force the piston 32 downwardly in the cylinder.

Figures 5A, 5B:
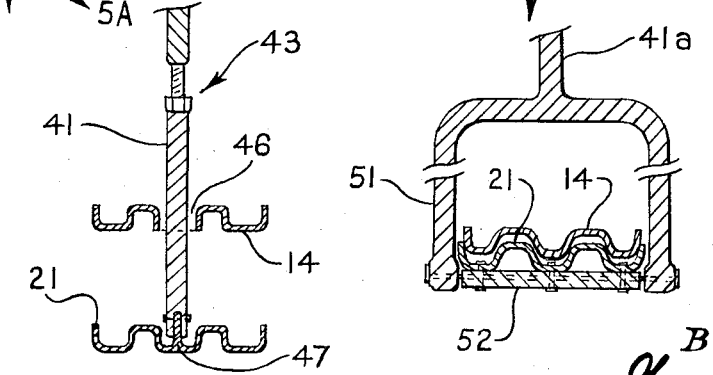
FIG. 5A is a sectional view taken in the plane 5A—5A of FIG. 3 illustrating one manner of connecting the levers or legs of the present invention to the support feet hereof.
FIG. 5B is a partial sectional view in plane 5B-5B of FIG. 2 illustrating an alternative connection of the levers or legs of the present invention to the pivotally mounted support feet.

A pair of rod-like legs 41 and 42 are connected between the mounting unit 36 on the bottom end of the piston rod and the aligning feet 21 and 22. The legs 41 and 42 are pivotally connected to the mounting unit 36 as, for example, by the provision of a forked end on the leg 42 and a knife end on leg 41, all pinned to the mounting unit, as generally indicated in FIG. 4. Mounting unit 36 carries rollers 39 on each end of the mounting pin for engaging the channel straps 37 to absorb side loading of the piston rod. The legs 41 and 42 may be provided as solid rods or pipes of substantial strength and, if desired, may be provided with means for varying the lengths thereof as generally indicated at 43 of FIG. 5A. Each of the legs are, as noted above, pivotally connected to one of the feet and in this respect reference is made to FIG. 5A illustrating the rod 41 as extending through a slot 46 in the wheel rim 14 and having a lower forked end fitting over a central upward extension 47 on the foot and pinned thereto. The legs are connected to the feet at approximately the centers of the feet as regards length thereof and are adapted to pivot the feet outwardly from the wheel rim when the ram is actuated to drive the piston rod thereof downwardly toward the wheel axle.

Various alternative manners of connecting the legs and feet are possible and in FIG. 5B there is illustrated an alternative arrangement wherein a leg 41A is formed with a U-shaped end 51 extending about the wheel rim on the lateral sides thereof. A shaft 52 engages opposite ends of the U-shaped leg termination 51 in pivotal relationship thereto and in turn is bolted to the exterior side of the foot 21. Whatever the type of pivotal connection of leg to foot, it is herein provided that the structure shall be capable of moving the legs outwardly of the wheel to pivot the feet about the hinged connection thereof to the wheel rim.

In addition to the foregoing elements of the present invention, there is also provided hereby means for automatically retracting the feet from the extended position illustrated in FIG. 3 upon termination of application of water pressure to the sprinkling system carried by the wheel hereof. Such means are herein illustrated as comprising a pair of tension springs 61 and 62 connected to the interior side of the wheel rim 14 on opposite sides of the ram 31 circumferentially of the rim and each connected to one of the legs 41 and 42. These springs are normally in tension when the feet 21 and 22 are retracted against the wheel rim and are further extended against the restoring force thereof when the legs 41 and 42 are moved downwardly to pivot the feet 21 and 22 outwardly of the wheel rim. Thus the springs serve to normally return the retain the feet into full engagement with the exterior of the wheel rim. At such time as water pressure is applied to the sprinkling system, including the pipe or line 12 forming the axle of the wheel, this pressure is also applied through the connection 38 to the hydraulic ram 31. Such hydraulic pressure then forces the ram piston 32 downwardly in the cylinder 33 so as to force the piston rod downwardly and move the upper ends of the legs 41 and 42 toward the axle of the wheel. This then forces the legs downwardly and outwardly of the wheel to pivot the feet 21 and 22 about the hinges 23 and 24 thereof respectively into the position shown in FIG. 3. The feet are maintained in this extended aligning position by water pressure in the ram but as soon as such pressure is released by removing the pressure applied to the sprinkling system, the springs 61 and 62 immediately retract the legs by pulling them upwardly from the wheel so as to draw the feet 21 and 22 back into peripheral contact with the wheel rim. It will be appreciated that the legs 41 and 42 must be pivotally mounted at both ends thereof or some alternative provision be made for accommodating the necessary change in angle between the legs and at least the aligning feet as the legs are moved inwardly and outwardly of the wheel.

It will be appreciated that the present invention provides an automatic aligning and positioning means for wheels of a wheel roll sprinkler system as is employed in agricultural irrigation. Testing of the present invention has established that the aligning means hereof are capable of righting a sprinkler wheel having an initial inclination in excess of 67° from desired position. As noted above, a variety of factors tend to influence the rotary position of a sprinkler wheel following movement of the system. In order for the sprinkler heads to properly operate they are to be located in an upright position and thus the individual wheels of the sprinkler system require rotary positioning to ensure such sprinkler head orientation. The present invention provides for such positioning or alignment entirely automatically so that it is not necessary for an operator to physically re-orient individual wheels and block them in desired position. Inasmuch as a wheel roll sprinkler system has a substantial physical area of structure, it is also possible for wind loads to move the wheels and the present invention prevents any such movement so that once the system is moved and aligned or positioned by the present invention, such alignment or position is maintained as long as water pressure is applied to the system. Release of water pressure results in automatic retraction of the aligning feet of the present invention so that the entire system is then ready for movement to a new location. Only the application and termination of water pressure is required for complete operation of the present invention.

As noted above, the present invention admits of various modifications. Additionally the invention is advantageously embodied to be adaptable for mounting upon different wheels as, for example, in a wheel roll irrigation system. Preferably such mounting may be accomplished without the necessity of extensive modification of the wheel itself. With respect to certain variations of the present invention, reference is made to FIG. 6 illustrating an alternative hydraulic ram arrangement for pivoting the aligning feet between the extended and retracted positions thereof. As shown, a ram 71 is provided as a cylinder 72 depending from a cylinder head 73 with a support and supply tube 74 extending axially through the cylinder into connection with the cylinder head. Within the cylinder 72 there is provided a piston 76 connected to a tubular piston rod 77 slidably disposed upon the supply and support tube 74. The upper end of the ram 71 is attached to the wheel rim 14 as, for example, by clamping means generally illustrated at 78. The rigid support and supply tube 74 extends radially inward of the wheel from the cylinder head 73 into fixed engagement with the pipe 12 forming the axle of the wheel. This engagement of the tube 74 with the axle may be accomplished by the provision of a saddle clamp about the axle with the tube being threaded into the clamp. It is noted, however, that the tube 74 extends into communication with the interior of the pipe axle and also that the tube at its upper end communicates through openings in the cylinder head with the cylinder above the piston 76.

There is thus provided a fluid flow path from the pipe 12 to the ram 71.

The legs 41 and 42 are pivotally connected at the upper ends thereof to a yoke 79 rigidly affixed to the piston rod 77 adjacent the lower end thereof. In FIG. 6 the yoke 79 is rotated 90° from actual position in order to show the yoke. It will be seen that application of water pressure to the system, including the pipe 12, will apply water pressure to the ram above the piston 76 thereof to force the piston downwardly. This then slides the piston rod 77 down about the support and supply tube 74 to move the yoke 79 toward the axle and thus to pivot the aligning feet outwardly into the position illustrated in FIG. 3. Provision is also made for automatically returning the feet to retracted position and in this embodiment there is illustrated a coil spring 81 disposed about the support tube 74 in compression between the yoke 79 and axle 12. Thus the spring will be seen to continuously urge the yoke radially outward of the axle and consequently termination of water pressure applied to the system allows the spring to force the yoke and piston upwardly to retract the feet. The strength of the spring 81 is less than the force applied by the ram 71 with the piston thereof under pressure from the water system but the spring is sufficiently strong to force the piston upwardly when water pressure is released from above the piston.

Although the present invention is not limited to utilization with wheel roll irrigation systems, it is particularly advantageous in connection thereof. In this respect attention is invited to FIG. 7 of the drawings schematically illustrating such a system and including the present invention. In FIG. 7A an irrigation system of the above-noted type is shown in aligned position, i.e., the pipe 91 extending through a plurality of wheels 92 is disposed in a straight line. At the center of the system there is provided drive means 93 for moving the system from one location to another as, for example, progressively across a field between separate irrigating locations. As the system is moved from one location to another by the drive means 93 the nature of the terrain or the like may impede the progress of certain wheels so that the system is somewhat out of alignment after movement. A mislined system is illustrated at FIG. 7B. With the present invention being provided on one wheel on each side of the drive means, as indicated at 94, application of water pressure to the line 91 will cause these wheels 94 to right themselves, i.e., to be rolled into desired orientation so that the pipe will be turned to dispose sprinkler heads 96 thereon upwardly. The drive means 93 is conventional and operates to rotate the pipe so that the wheels secured thereto roll during movement of the system. The misalignment illustrated in FIG. 7B is exaggerated to emphasize the problem overcome by the present invention.

In a typical installation the individual wheels 92 may be separated a distance of approximately 40 feet along the line and yet it is only necessary to provide one wheel in accordance with the present invention on each side of the central drive means. Preferably these wheels 94 are located well outwardly from the center of the system as illustrated. It is not necessary to modify each of the wheels of the system in accordance with the present invention in order to realize automatically alignment of the system by the present invention.

Although the present invention has been described and illustrated with respect to particular preferred embodiments thereof, it is not intended to limit the invention to details of description or illustration. Various modifications and variations of the present invention will be apparent to those skilled in the art.

What is claimed is:

1. An improvement in wheel structure for a wheeled sprinkling system having a pipe axle through which water is passed to sprinkling heads comprising,
   a hydraulic ram mounted within the wheel rim and having a piston movable toward and away from the wheel axle,
   means connecting said ram to the pipe axle for hydraulic ram operation,
   a pair of positioning feet pivotally mounted on the exterior of the wheel rim, and
   means connecting the piston of said ram to said feet for pivoting the feet outwardly of the wheel rim into operated position upon application of water pressure to the pipe of the system.

2. The improvement of claim 1 further defined by resilient restoring means engaging the means connecting the ram piston to said feet for continuously urging said feet to pivot toward the wheel rim whereby termination of application of water pressure to the system automatically retracts the feet.

3. The improvement of claim 1 further defined by said positioning feet having substantially the same curvature as said wheel rim and extending in opposite directions thereabout from said pivotal mountings, whereby the retracted feet provide substantially no impediment to rolling of the wheel.

4. The improvement of claim 1 further defined by said ram being mounted between the wheel rim and axle and having a piston rod extending toward the axle, and said means connecting said ram piston and positioning feet comprising a pair of rigid legs pivotally connected to said piston rod and pivotally connected one to each of said feet.

5. The improvement of claim 3 further defined by said feet having a length of the order of 45° of arc along the wheel rim and being separated by a distance along the rim of the order of the length of a foot.

6. An improved self-aligning wheel for a wheel roll sprinkling system in which a water pipe carrying sprinklers forms the axle of a wheel and comprising
   a pair of wheel aligning feet having substantially the same curvature as the wheel rim and normally disposed against the exterior of the wheel rim, said feet being pivotally mounted on the wheel rim at adjacent ends of the feet which are spaced apart along the rim,
   a pair of rigid legs pivotally connected one to each of said feet and extending inwardly of the wheel,
   a hydraulic ram mounted within the wheel rim and pivotally connected to said legs, said ram being connected through a conduit to the wheel pipe axle for ram actuation by sprinkling system water pressure to automatically pivot said aligning feet outwardly of the wheel rim upon application of water pressure to the system for aligning the wheel, and
   spring means connected between said legs and the interior of the wheel rim for urging the legs inwardly of the wheel for automatically retracting the aligning feet at termination of water pressure in the sprinkling system so that the wheel is readily rolled to a different location.

7. The self-aligning wheel of claim 6 further defined by said wheel rim having a pair of circumferential slots therein through which said legs separately extend into pivotal engagement with said aligning feet.

8. The self-aligning wheel of claim 6 further defined by said legs each having U-shaped outer ends extending about the wheel rim into pivotal engagement with the respective aligning feet.

9. The self-aligning wheel of claim 6 further defined by each of said aligning feet subtending an angle of the order of 45° along the wheel rim, said feet being pivotally mounted at ends thereof adjacent each other and said adjacent ends being separated a distance of arc along the rim of the order of 45°.

10. In a wheel roll sprinkling system including a wheel formed as a wheel rim connected by spokes to a sprinkler pipe as the wheel axle, the improvement comprising,
    a pair of curved aligning feet pivotally mounted at adjacent ends thereof on the exterior of the wheel rim with the mounting of the two feet being separated along the rim for movement between retracted positions against the rim to actuated positions pivoted radially outward of the rim holding the wheel from rotating, said feet having substantially the same curvature as the wheel rim,
    hydraulic ram mounted within the wheel rim and connected to the wheel axle for actuation by sprinkler system water pressure,
    a pair of legs pivotally connected to a piston rod of said ram and extending into pivotal engagement with separate feet at a distance from the mounting of the feet for pivoting the feet to actuated position upon ram activation, and
    spring return means connected between said legs and the interior of the wheel for urging the feet into retracted position whereby said feet are retracted upon termination of water pressure to the sprinkling system.

* * * * *